(No Model.) 2 Sheets—Sheet 1.

D. P. O'LEARY & S. B. KULL.
PHOTOGRAPHIC CAMERA.

No. 594,120. Patented Nov. 23, 1897.

WITNESSES:
Edward Thorpe

INVENTORS
D. P. O'Leary
S. B. Kull
BY
ATTORNEYS.

(No Model.) 2 Sheets—Sheet 2.

D. P. O'LEARY & S. B. KULL.
PHOTOGRAPHIC CAMERA.

No. 594,120. Patented Nov. 23, 1897.

WITNESSES:
Edward Thorpe
Theo. G. Hoster

INVENTORS
D. P. O'Leary
S. B. Kull
BY
ATTORNEYS.

THE NORRIS PETERS CO., PHOTO-LITHO., WASHINGTON, D. C.

UNITED STATES PATENT OFFICE.

DANIEL P. O'LEARY AND SAMUEL B. KULL, OF NEW YORK, N. Y.

PHOTOGRAPHIC CAMERA.

SPECIFICATION forming part of Letters Patent No. 594,120, dated November 23, 1897.

Application filed July 22, 1896. Serial No. 600,132. (No model.)

*To all whom it may concern:*

Be it known that we, DANIEL P. O'LEARY and SAMUEL B. KULL, both of New York city, in the county and State of New York, have invented a new and Improved Photographic Camera, of which the following is a full, clear, and exact description.

The object of the invention is to provide a new and improved photographic camera which is simple and durable in construction and arranged to automatically control the movement of the film by means of a shutter mechanism.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1:
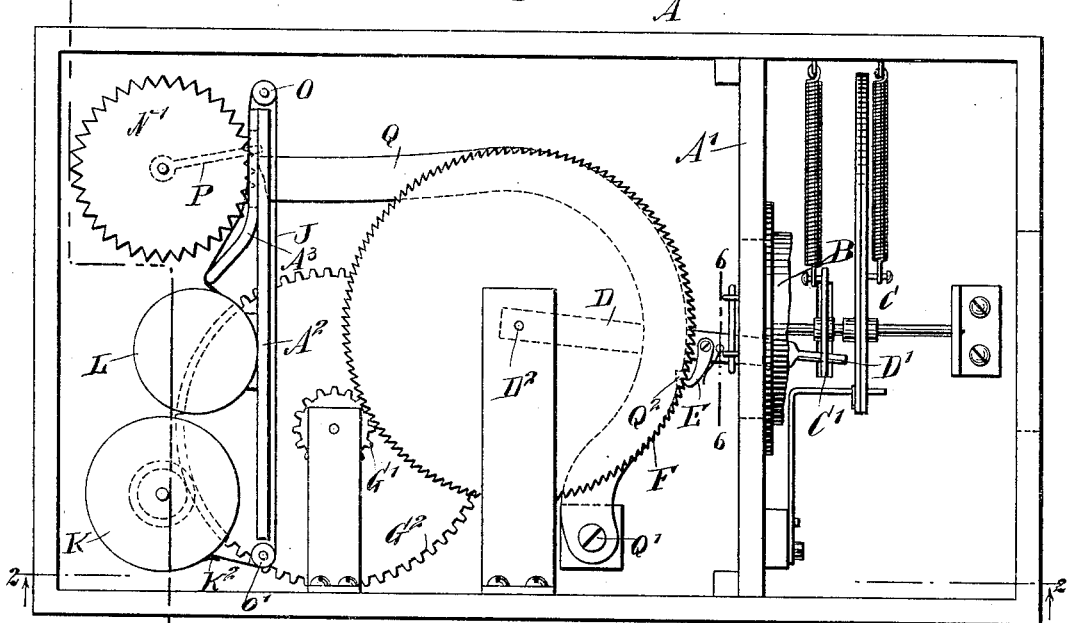
Figure 2:
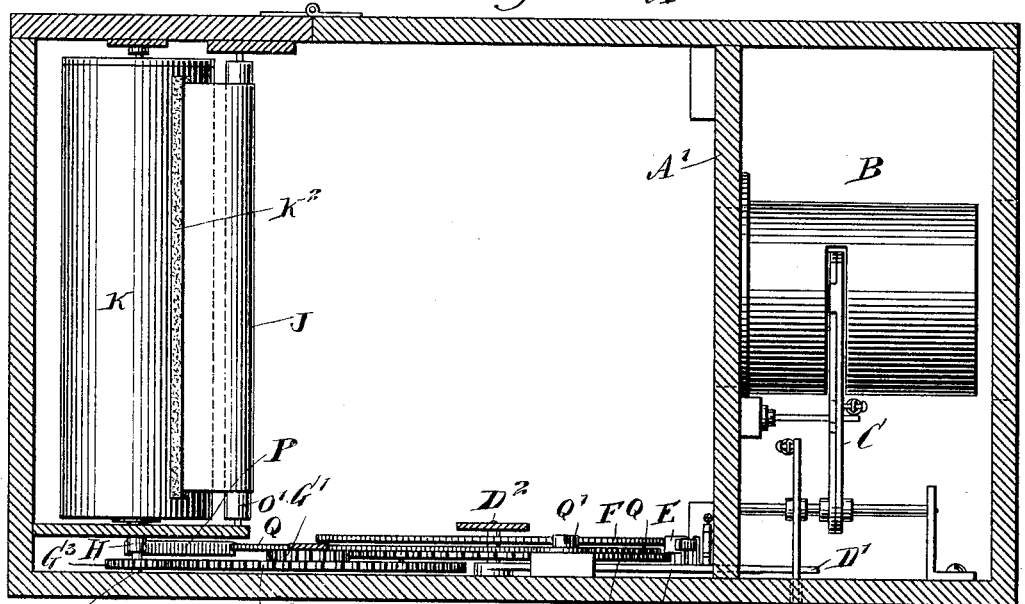
Figure 3:
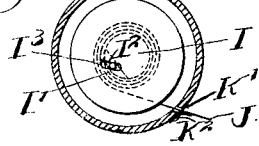
Figure 4:
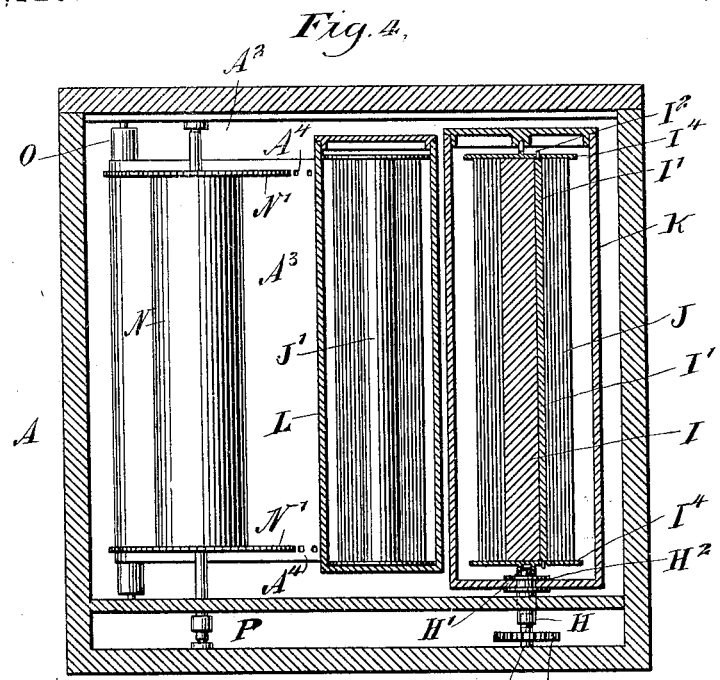
Figure 5:
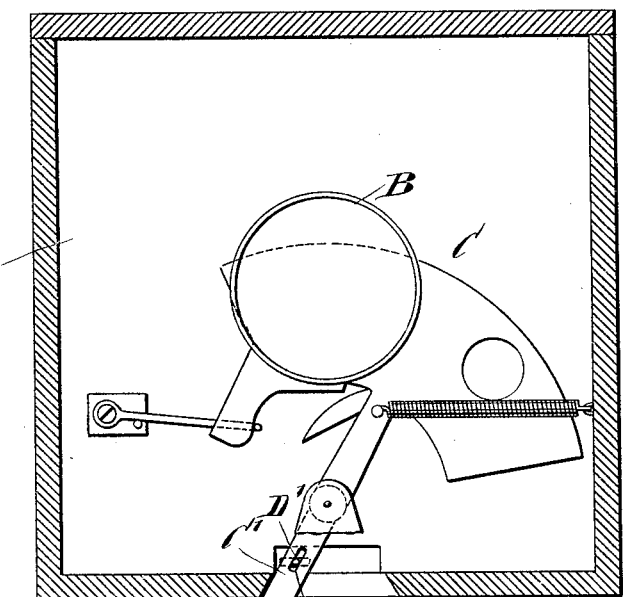
Figure 6:
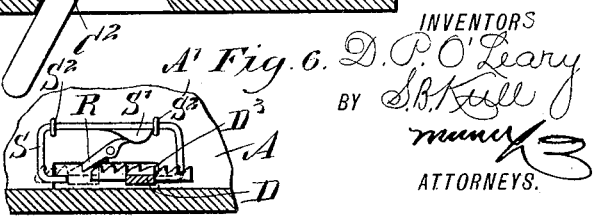

Figure 1 is a plan view of the improvement with the cover of the casing omitted and parts broken out. Fig. 2 is a sectional side elevation of the same on the line 2 2 of Fig. 1. Fig. 3 is a sectional plan view of the winding-up roller and casing. Fig. 4 is a transverse section of the improvement on the line 4 4 of Fig. 1. Fig. 5 is a sectional front view of the improvement with the casing in section, and Fig. 6 is a cross-section of the locking device on the line 6 6 of Fig. 1.

The improved photographic camera is provided with a suitably-constructed casing A, in the front end of which is arranged a transversely-extending partition A', supporting a lens-tube B, provided with a shutter mechanism C, preferably of the construction shown and described in the application for Letters Patent of the United States, Serial No. 578,936, filed by us on February 11, 1896, and allowed June 18, 1896.

The shutter mechanism C is provided with an operating-lever C', which extends through an opening in the casing A to the outside to be under the control of the operator, so as to permit the latter to manipulate the shutter in the manner described in the patent above referred to.

In the operating-lever C' is formed a slot $C^2$, into which extends loosely the end D' of a lever D, fulcrumed at $D^2$ in the inside of the casing, said lever D carrying a spring-pressed pawl E, in mesh with the teeth of a ratchet-wheel F, mounted to turn loosely on the fulcrum $D^2$ of the lever D. On one face of this ratchet-wheel F is secured a gear-wheel G, which forms part of a train of gear-wheels and which is in mesh with a pinion G', mounted to turn in the casing A and provided on its face with a gear-wheel $G^2$, in mesh with a pinion $G^3$, secured on a vertically-disposed shaft $G^4$, journaled in suitable bearings in the casing A. The upper end of the shaft $G^4$ is formed with a square offset engaging a correspondingly-shaped socket in the lower end of a shaft H, likewise journaled in suitable bearings in the casing A, and formed at its upper end with a square offset H', in engagement with a correspondingly-shaped socket formed at one end of a winding-up roller I for winding up the film J. The latter passes to the winding-up roller I by means of a casing K, inclosing the said roller I, and formed in its side with a vertically-extending slot K', normally closed by a strip $K^2$, of felt or other suitable material.

The upper end of the winding-up roller I is journaled in one end of the casing K and the other end of the latter is held on flanges $H^2$ on the shaft H, so that the entire casing K, containing the winding-up roller I and the wound-up film J, can be removed without danger of the film becoming light-struck and without danger of disturbing the train of gear-wheels or the pawl-and-ratchet mechanism for setting the said train of gear-wheels in motion, as above described.

The film J is arranged in the form of a roll and is contained in a casing L, attached to the back of a partition $A^2$, arranged between the top and bottom of the casing and forming a guide for that portion of the film to be exposed. (See Fig. 1.) The end of the roll of film contained in the casing L is passed through a vertical slit in the wall of the casing, to be then stretched over a guide-board $A^3$, secured to the back of the partition $A^2$.

At the top and bottom of the board and at the rear face thereof are formed recesses adapted to be engaged by toothed wheels N', formed on the upper and at the lower ends of an index-roller N, journaled in suitable bearings in the top and bottom of the casing A.

The teeth of the wheels N' are adapted to pierce the film or engage the openings in said film at the time the latter passes over the guide-board $A^3$, so that the moving film will revolve the index-roller N. The film after leaving the index-roller N and the end of the guide-board $A^3$ passes over a roller O, journaled at one end of the partition $A^2$, the film then extending over the front face of the said partition around a second roller O', disposed vertically at the other end of said partition, as will be understood by reference to Fig. 1. The film now passes from the roller O' to the slit K' in the casing K to wind up on the winding-up roller I, as previously described.

In order to hold the end of the film securely in place on the winding-up roller I, we provide the latter with a flat portion at its periphery and with a longitudinally-extending bar I', formed at its ends with pins $I^2$, engaging angular slots $I^3$, formed in the flanges $I^4$ of the roller I. Thus the end of the film is passed between the flat surface of the roller and the bar I' to cause the end of the film to be clamped to the roller to insure a proper winding of the film whenever the roller I is rotated.

The index-roller N is provided on its shaft with an arm P, adapted to engage the free end of a lever Q, fulcrumed at Q' to the casing A and having a curved portion adapted to engage the free end of the pawl E, so as to throw and hold the latter out of mesh with the teeth of the ratchet-wheel F whenever the said arm P moves the lever Q into an outermost position. When this takes place, then the pawl E is rendered ineffective as regards the ratchet-wheel F, no matter what movement is given to the lever D by the operating-lever C' of the shutter mechanism.

In order to lock the lever D in place in case the operating-lever C' of the shutter mechanism is not moved to the end of its outermost position or stroke, we provide the lock shown in Figs. 1 and 6. For the purpose mentioned the lever D is provided on the top with a rack $D^3$, adapted to be engaged by a pawl R, fulcrumed on the partition A' and adapted to be engaged by a cam-shaped lug S', held on a bar S, preferably made U-shaped and fitted to slide at its middle portion in bearings $S^2$, attached to the partition A'. The ends of the bar S are formed with inwardly-extending lugs extending on opposite sides of the lever D and in the path of the latter, so that when the lever is shifted the corresponding side of the lever engages the corresponding lug.

Now by reference to Figs. 1, 5, and 6 it will be seen that when the lever D is moved to the left, but not to the end of its stroke, then the pawl R will engage the rack $D^3$ to lock the lever against return movement until the said lever is moved to the end of its stroke, so that the lever shifts the bar S from the right to the left to cause the cam-shaped lug S' to act on the pawl R and throw the latter out of engagement with the rack $D^3$. The lever can then be returned again to the right-hand end position shown in Fig. 6. In moving into this position the rack $D^3$ engages the other lug on the bar S to return the latter to its former position and to cause the pawl R to again drop into its normal position ready for engagement with the rack $D^3$ whenever the lever D is shifted to the left.

The operation is as follows: When the several parts are in the position illustrated in the drawings, then the shutter mechanism C is in a position ready for setting and the operator in shifting the lever C' to the other side causes a swinging of the lever D, whereby the pawl E will turn the ratchet-wheel F and set the train of gear-wheels G G' $G^2$ $G^3$ in motion to rotate the shaft H and the winding-up roller I, so that the previously-exposed portion of the film J is wound up on the said roller I and the unexposed portion of the film is stretched between the rollers O O' in front of the partition $A^2$. During this movement of the film J the latter causes a turning of the index-roller N, so that the arm P thereof engages the free end of the lever O to swing the latter outward to cause the pawl E to be thrown out of mesh with the ratchet-wheel F. Thus a turning of the winding-up roller I and the moving of the film J during the exposing period cannot take place, and consequently the film remains stationary during the exposure, which takes place as soon as the operator moves the lever C' back to its previous position, said lever operating the shutter mechanism for the exposure, as fully described in the application above referred to. During this movement of the lever C' the lever D is caused to swing, but as the pawl E rides on the lever Q it does not affect the ratchet-wheel F; but when the lever C' is moved back to its previous position then the free end of the pawl E drops into a notch $Q^3$, formed in the lever Q, and permits the pawl E to again engage the ratchet-wheel F. Thus by the next movement of the lever C' the pawl E commences to turn the ratchet-wheel F, and in doing so sets the train of gear-wheels in motion to actuate the winding-up roller I and the film J, which in turn actuates the index-roller N, so that the arm P moves out of engagement with the lever Q, and consequently the latter can pass back to its former position and the pawl E will remain in mesh with the ratchet-wheel F to insure a full movement of the film J to wind up the exposed portion of the film and bring an unexposed portion again in front of the partition $A^2$. The train of gear-wheels is dimensioned in such a manner that the movement given to the ratchet-wheel F moves the film J the desired distance and the said film causes a complete revolution of the index-roller N, so that the arm P acts on the lever Q in unison with the movement given to the shutter mechanism by the operator manipulating the lever C', as above described. Thus it will be seen that the winding-up roller I is controlled from the operating-lever of the shutter mechanism to cause a movement of the film, and the latter imparts rotary motion to the index-roller N, which in turn controls, by its arm P, the throw-out lever Q for the pawl E.

Having thus fully described our invention, we claim as new and desire to secure by Letters Patent—

1. A photographic camera, provided with a roller for winding up the film, a train of gears for turning the said roller, and a pawl-and-ratchet mechanism connected with the said train of gear-wheels and actuated by the shutter mechanism, substantially as shown and described.

2. A photographic camera, provided with a winding-up roller for the film, mechanism operated by a pawl-and-ratchet device for moving the said winding-up roller, an index-roller actuated by the film, and a connection between the said roller and the pawl of the pawl-and-ratchet device, whereby the said pawl may be thrown out of operation, substantially as shown and described.

3. A photographic camera, provided with an index-roller actuated by the movement of the film, mechanism for moving said film, and a pawl-and-ratchet device connected with said mechanism, the pawl of the said device being controlled from the said index-roller, substantially as shown and described.

4. A photographic camera, provided with a winding-up roller for the film, a train of gear-wheels for turning the said roller, a pawl-and-ratchet mechanism connected with the said train of gear-wheels and actuated from the shutter mechanism, and an index-roller rotated from the film and controlling the said pawl, substantially as shown and described.

5. A photographic camera, provided with a winding-up roller for the film, a train of gear-wheels for turning the said roller, a pawl-and-ratchet mechanism connected with the said train of gear-wheels and actuated from the shutter mechanism, an index-roller rotated by the film, and a throw-out lever for the pawl of the said pawl-and-ratchet mechanism, the said lever being controlled by the said index-roller, substantially as shown and described.

6. A photographic camera, provided with a winding-up roller for the film, a train of gear-wheels for turning the said roller, a pawl-and-ratchet mechanism connected with the train of gear-wheels and actuated from the shutter mechanism, an index-roller rotated by the film, a lever adapted when moved to engage the said pawl to throw and hold the latter out of operation, and an arm on the shaft of the said index-roller adapted to engage the free end of the said lever, substantially as shown and described.

7. A photographic camera, provided with a winding-up roller for the film, a shutter mechanism, mechanism for connecting said shutter mechanism and roller, whereby an intermittent rotary motion is imparted to the roller upon operating the said shutter mechanism, an index-roller rotated by the intermittently-moving film, means for controlling from the index-roller the mechanism connecting the shutter mechanism and the winding-up roller, whereby the movement of the winding-up roller is prevented during the exposing period, and a locking device for preventing the return movement of the mechanism connecting the shutter mechanism and the winding-up roller until a full movement is imparted to the winding-up roller, substantially as described.

8. A photographic camera, provided with a partition forming a guide for the portion of the film to be exposed, a casing for the film at the rear of the partition, a guide-board secured to the rear of the said partition near one side, the rear face of the said guide-board at the top and bottom being formed with recesses, and an index-roller having its ends provided with toothed wheels adapted to engage the film at the said recesses, substantially as shown and described.

9. A photographic camera, provided with an index-roller having toothed wheels adapted to be engaged by the intermittently-moving film to rotate the said roller, a lever connected with the shutter mechanism, mechanism connected with the said lever for moving the film intermittently, means for controlling the said mechanism from the index-roller whereby the said mechanism is rendered inoperative during the exposing period, and means for locking the said lever against return movement until it has completed its stroke, substantially as described.

10. A photographic camera, provided with a revoluble winding-up roller for the film, the said roller having a flat portion at its periphery, and a longitudinally-extending bar provided at its ends with pins engaging slots in the flanges of the roller, and a casing for the said roller formed in its side with a slot for the passage of the exposed film to the roller, substantially as shown and described.

11. A photographic camera, provided with an operating-lever adapted to be moved by the shutter mechanism, a locking device for the said lever and comprising a rack on the said lever, a slidable bar having ends adapted to be engaged by opposite sides of the said lever, to shift the bar, a pawl adapted to engage the said rack, and a cam projection on the said bar for throwing the pawl out of engagement with the said rack when the lever reaches the end of its throw, substantially as shown and described.

DANIEL P. O'LEARY.
SAMUEL B. KULL.

Witnesses:
GOTTHILF MORDHORST,
GOTTLIEB MAIER.